Figures 1, 2:
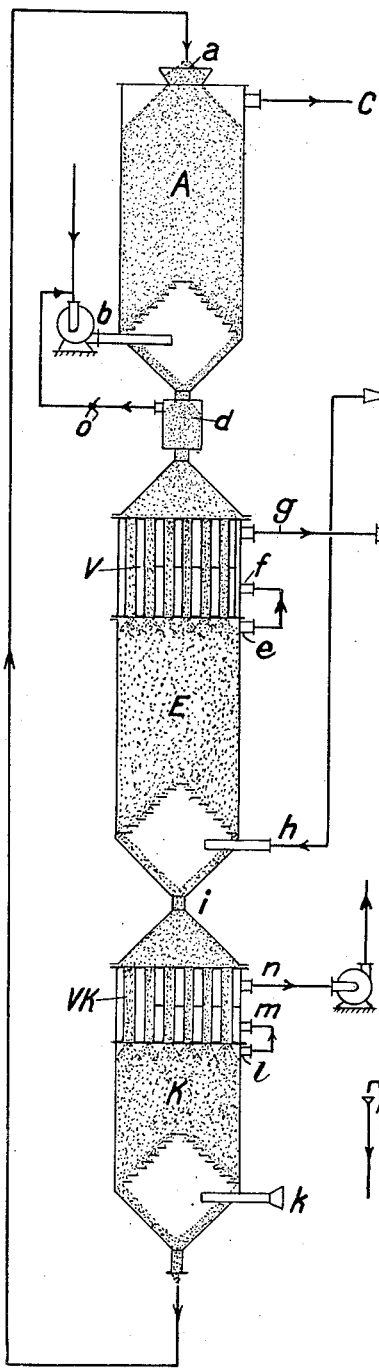

Dec. 15, 1931. F. J. BECHTHOLD 1,836,301
REGENERATING GRANULAR ADSORBENTS
Filed May 31, 1927  2 Sheets-Sheet 1

Inventor:
Friedrich Jakob Bechthold
By Byrnes Townsend & Brickenstein
Attorneys.

Dec. 15, 1931.  F. J. BECHTHOLD  1,836,301
REGENERATING GRANULAR ADSORBENTS
Filed May 31, 1927  2 Sheets-Sheet 2

Inventor:
Friedrich Jakob Bechthold,
By Byrnes, Townsend & Brickenstein,
Attorneys.

Patented Dec. 15, 1931

1,836,301

UNITED STATES PATENT OFFICE

FRIEDRICH JAKOB BECHTHOLD, OF FRANKFORT-ON-THE-MAIN, GERMANY

REGENERATING GRANULAR ADSORBENTS

Application filed May 31, 1927, Serial No. 195,560, and in Germany May 31, 1926.

This invention relates to a method of regenerating granular adsorbents combined with the recovery of the adsorbed substances in systems, in which the adsorbents are continuously or discontinuously moved.

The known adsorption methods using solid adsorbents may be divided into two groups. In the first group the adsorbents are not moved during the adsorption process, whereas in the second group the adsorbents such as silica gel, active charcoal or other bodies with great surfaces are moved in the same direction or in counter current to the gas to be treated during the adsorption process.

The methods of the first group have all the disadvantages of a discontinuous operation, because there must be present several containers filled with adsorbents in order to enable an interchangeable connection or disconnection of the different containers. Furthermore the economy of heat is very poor in these discontinuous systems, as in accordance with the temperatures necessary for the different steps of operation such as adsorption, heating and cooling heat has to be conducted to or away from each container, this conduction causing great losses of heat. The additional apparatus such as boilers, pumps for the cooling water and the like necessary for the execution of these different operations must be adapted to render services far above the average, in order to comply with the maximum requirements in intermittent processes.

The methods of the second group, in which the adsorbents are moved during the process in order to obtain a continuous operation avoid the disadvantages with regard to heat economy of the stationary systems; the regeneration process of the adsorbents is however carried through only by indirect heating.

According to the invention the heating and rinsing of the moved adsorbents in continuous systems for regenerating purposes is done by direct contact of the adsorbents with condensible vapors. This is possible, as the condensation of the steam upon those layers of the adsorbent which are not yet hot enough in the beginning of the heating process may be avoided.

The different steps of the new method are the adsorption of substances in the vapor phase by adsorbents with great surface, the regeneration of the adsorbents by heating and rinsing them with condensable vapors thereby at the same time expelling the absorbed substances and the cooling of the adsorbents, all operations being carried through in a continuous system. The above described different steps of operation must be carried through in separate sections namely in a pre-section for indirect heating or cooling and in one or several combined main sections for direct heating or cooling. Only when executing the process in these separate sections and in combination with special provisions described later it is possible to conduct the process in such a manner, that the disadvantages, such as the condensation of steam upon the colder layers of adsorbents during the heating process or the ignition of the adsorbents during the cooling process, when the hot layers are coming into direct contact with cool air, are avoided.

The heating of the adsorbents is carried through by directly passing condensible vapors especially steam in counter current through the preheated adsorbents. The vapors used for the direct heating are then employed for the indirect preheating of the adsorbents for example by passing them through special preheaters, which are passed by the adsorbents before bringing them into the direct heating section. By these means it is avoided that the vapors are condensed upon the layers of adsorbents entering the heating section, as the adsorbents and the adsorbed substances, evaporated in the preheating section, are by the indirect preheating already preheated to a temperature above the boiling point of the vapors used for the direct heating of the adsorbents in the heating section.

The cooling of the adsorbents is done by using the same principle as described above for the heating. Cold air or any other gas is blown in counter current through the moving adsorbents. When the air reaches that part of the cooling section, where the adsorbent still has a temperature, at which an ignition could occur, the cooling air is taken out from the direct cooling section and used for indirect cooling of the adsorbents, which are passing precoolers for indirect cooling before entering the direct cooling section.

In order to give a better and more detailed description of the above mentioned principles, some operating schemes are shown in the annexed drawings in seven different figures. The description of these operation schemes given below refers to the use of active charcoal and benzene. Other adsorbents such as silica gel or the like and other substances to be adsorbed such as gasoline or the like may naturally also be used.

In Fig. 1 the active charcoal enters the absorber A at $a$. The benzene vapor containing gas enters the adsorber A at $b$, passes the adsorbents moving downwards in the adsorber in counter current and leaves the adsorber at $c$. The active charcoal having passed the adsorber A then enters the preheater V at $d$, in which the charcoal is preheated by indirect heat. The charcoal and that part of the adsorbed substances, which is already removed from the adsorbent in this preheater V, has when leaving the preheater and entering the direct heater E attained a temperature, which is high enough to avoid condensation of the vapors used for the regeneration of the charcoal and the driving off of the adsorbed substances.

It is of importance to prevent the vapors used for the regeneration of the charcoal in the heater E from entering the charcoal in the preheater V. For this purpose means are provided to obtain a higher pressure in the preheater V than in the part $e$ of the heater E, where the vapors used for direct heating leave the heater. One may for example blow a suitable gas mixture such as a mixture of the gases and vapors to be adsorbed from above into the preheater V and thus prevent the entering of vapors used for regeneration from the heater into the preheater. This gas mixture at the same time has a rinsing action upon the charcoal and leaves the heater E by $e$ together with the benzene vapors and the steam used for direct heating of the charcoal in the heater E. The operation of this step may be governed and controlled by applying pressure meters or by providing a slide valve $o$ in the tube leading from $d$ to $b$.

The active charcoal is then treated with direct steam in the heater E, thereby raising the temperature of the charcoal and removing the adsorbed substances. This temperature is dependent upon the kind of substances adsorbed.

A further raising of the regeneration temperature is possible by connecting the heater E to a further direct heater L as shown in Fig. 2. The steam entering this second direct heater L at $p$ may be more superheated than the steam entering the heater E at $h$. The superheated steam in the second direct heater L is preferably guided in a special circle, leaving the heated L at $q$, in order to prevent noxious substances removed from the charcoal to come in contact with the charcoal and the expelled substances in the heater E.

The benzene removed from the charcoal by the heat and the rinsing effect of the steam leaves the heater E at $e$ together with the steam and enters the preheater V at $f$, in order to assist the preheating. The steam and benzene vapor mixture leaving the preheater V at $g$ passes to the compression evaporator CV and a condensator C and enters a separator S. The steam necessary for the operation is produced in a boiler D and enters the heater E at $h$.

In the above described method any kind of vapors instead of steam may be used for the regeneration of the charcoal and any temperature desired may be obtained. Heat conduction by the walls of the different containers may be avoided by applying suitable insulations, eventually heated insulations.

The charcoal may be heated to any temperature as the following cooling process, which will now be described, is suitable even for very high temperatures. The hot charcoal leaving the heater E or L enters a precooler VK at $i$. By indirect cooling the temperature of the charcoal is lowered so much, that ignition cannot take place and that the further cooling may therefore be effected by bringing the charcoal into direct contact with cool air. The cooling air enters the cooler K at $k$, passes the cooler K in counter current to the dropping charcoal and leaves the cooler K at $l$, in order to enter the precooler VK at $m$. Air does not come into direct contact with the upper and hottest layers of charcoal in the precooler VK, as the length and cross section of the connection is so dimensioned, that a small amount of steam always enters the upper zone of the cooler K from the precooler VK and is sucked off together with the cooling air having then a temperature above the boiling point of the water.

The pressures in conduits $l$, $m$ and $n$, and the cross-section of $i$ are so adjusted that a certain amount of gas or vapor passes from the heater E into the precooler VK so that in the charcoal surrounding the indirect cooling arrangement in VK, there is a certain superpressure with respect to K. Thereby cooling air is prevented from coming into direct contact with the still rather warm charcoal.

The air leaves the precooler at $n$ and may be used at another place of the system for preheating purposes.

Figure 3:
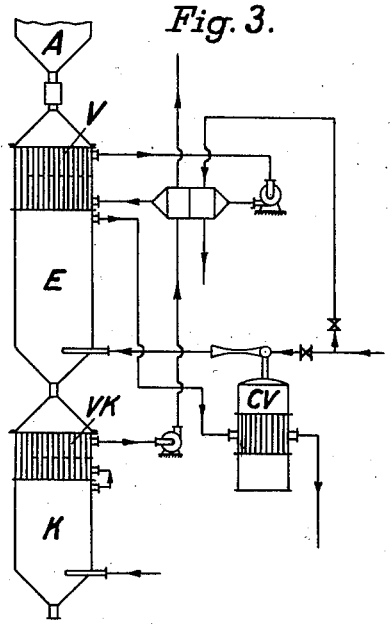
Figure 5:
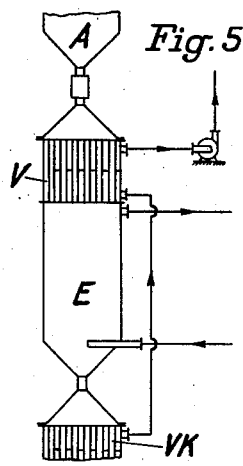

In certain cases it may be advisable not to use the steam coming from the direct heater for the indirect heating. In those cases the indirect heating may be effected by hot air or other gases or by electrical or other heating. In case that gases (air) are used for the indirect heating, it is advisable to conduct this gas (air) in a circle. The reheating of the gas (air) used for the preheating of the charcoal may be effected by the steam coming from the direct heater. In a similar manner the residue of heat of the air or gas leaving the precooler VK may be totally or partially recovered, by using this air or gas in the preheater V. (Fig 5.) The air or gas leaving the precooler VK may also be used for reheating the air or gas coming from the preheater V before it returns into the preheater V, thereby keeping the circle. (Fig. 3.)

Figure 4:
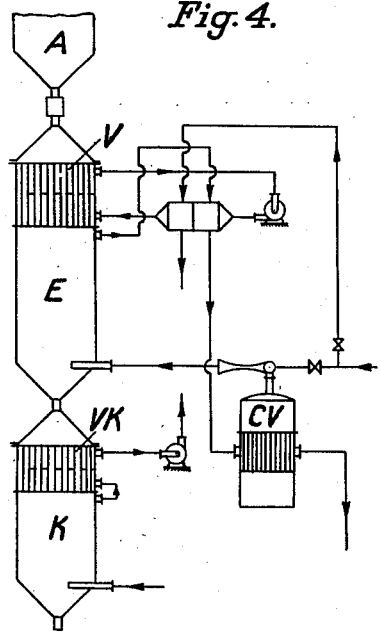

In the arrangement shown in Fig. 4 the steam-solvent vapor mixture coming from the direct heater E is used for indirectly heating the heating medium for the preheater V, before it passes to the compression vaporizer CV and thence to a condenser. The heating gas for the preheater V is also heated with the necessary amount of fresh steam to provide the heat requirement not supplied by the heat of the steam-solvent vapor mixture coming from E.

Figure 6:
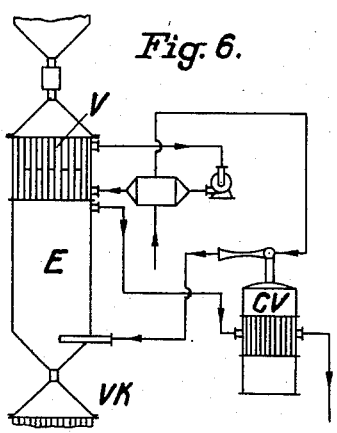
Figure 7:
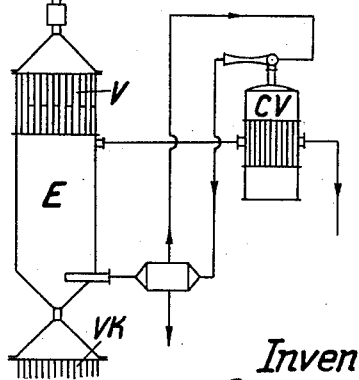

When only moderately superheated steam is to be employed for the direct heating of the charcoal and highly superheated steam is furnished by the boiler D, this surplus of heat may be used for preheating the gas or air used in the preheater V. Figure 6 shows such an arrangement. In order to obtain a high temperature in the direct heater E the superheated steam coming from the boiler D may be used before entering the compression evaporator C for superheating the steam coming from the compression evaporator CV and before entering the heater E. Fig. 7 shows such an operation scheme.

As in the preheating it is also possible to effect the precooling by special indirect cooling means. It may in some cases be of advantage to increase the precooling by arranging cooling serpentines filled with water or the like in the precooler. The heat taken up by the water or like may be recovered and used for preheating the charcoal.

It is obvious that the described operation schemes given as examples only may be varied without deviating from the spirit of the invention.

What I claim is:

1. A method of regenerating granular adsorbents combined with the recovery of the adsorbed substances in systems, in which the adsorbent is moved in a circle through the adsorption and regenerating chambers including the steps of heating the adsorbents coming from the adsorption chamber by indirect and direct contact with heated vapors and cooling them by indirect and direct contact with cooling media.

2. A method of regenerating granular adsorbents combined with the recovery of the adsorbed substances in systems, in which the adsorbent is moved in a circle through the adsorption and regenerating chambers according to claim 1 in which the indirect and direct heating and the indirect and direct cooling of the adsorbents coming from the adsorption chamber are effected successively and in separate sections.

3. A method of regenerating granular adsorbents combined with the recovery of the adsorbed substances in systems, in which the adsorbent is moved in a circle through the adsorption and regenerating chambers including the steps of heating the adsorbents coming from the adsorption chamber by indirect and direct contact with heated vapors and cooling them in which steam is used both for the indirect and direct heating of the adsorbents, with the proviso that the steam used for the direct heating is afterwards used for the indirect heating.

4. A method of regenerating granular adsorbents combined with the recovery of the absorbed substances in systems, in which the absorbent is moved in a circle through the adsorption and regenerating chambers according to claim 1 in which the same cooling mediums are used for the indirect and direct cooling of the adsorbents.

5. A method of regenerating granular adsorbents combined with the recovery of the adsorbed substances in systems, in which the adsorbent is moved in a circle through the adsorption and regenerating chambers according to claim 1 in which the same cooling mediums are used for the indirect and direct cooling of the adsorbents, with the proviso that the medium used for the direct cooling is afterwards used for the indirect cooling.

6. A method of regenerating granular adsorbents combined with the recovery of the adsorbed substances in systems, in which the adsorbent is moved in a circle through the adsorption and regenerating chambers according to claim 1 in which the heat acquired by the cooling medium used for the indirect cooling is afterwards used for the indirect heating of the adsorbents.

7. A method of regenerating granular adsorbents combined with the recovery of the adsorbed substances in systems, in which the adsorbent is moved in a circle through the adsorption and regenerating chambers according to claim 1 in which the cooling medium used for the indirect cooling is afterwards used for the heating of the heating medium for the indirect heating of the adsorbents.

8. A method of regenerating granular adsorbents combined with the recovery of the adsorbed substances in systems, in which the adsorbent is moved in a circle through the adsorption and regenerating chambers including the steps of heating the adsorbents coming from the adsorption chamber by indirect and direct contact with heated vapors and cooling them in which the vapors for the direct heating of the adsorbents are first used for the reheating of the vapors used for the indirect heating of the adsorbents.

9. A device for regenerating granular adsorbents combined with the recovery of adsorbed substances in systems, in which the adsorbent is moved in a circle through the adsorption and regenerating chamber comprising in combination with an adsorption chamber, at least one regenerating chamber, means to connect said regenerating chamber to said adsorption chamber, an indirect preheater in the top of said regenerating chamber, means to introduce heated vapors into said regenerating chamber and said preheater means to remove the vapors from said regenerating chamber, and said preheater means to prevent the vapors in said regenerating chamber to come in contact with the adsorbents in said preheater by allowing a small amount of steam or gas to enter the heating chamber from the adsorbent material in the preheater, a cooling chamber in connection with said regenerating chamber, an indirect precooler in the top of said cooling chamber, means to introduce cooling media into said cooling chamber and said precooler, means to remove said cooling media from said cooling chamber and said precooler and means to prevent the cooling medium in said cooling chamber to come in contact with the adsorbents in said precooler by allowing a small amount of steam or gas to enter the cooling chamber from the adsorbent material in the precooler.

10. A device for regenerating granular adsorbents combined with the recovery of adsorbed substances in systems, in which the adsorbent is moved in a circle through the adsorption and regenerating chamber comprising in combination with an adsorption chamber, at least one regenerating chamber, means to connect said regenerating chamber to said adsorption chamber, an indirect preheater in the top of said regenerating chamber means to introduce heated vapors into said regenerating chamber, means to remove said vapors from said regenerating chamber, means to lead said removed vapors into said preheater, means to prevent the vapors in said regenerating chamber to come in contact with the adsorbents in said preheater by allowing a small amount of steam or gas to enter the heating chamber from the adsorbent material in the preheater, a cooling chamber in connection with said regenerating chamber, an indirect precooler in the top of said cooling chamber, means to introduce a cooling medium into said cooling chamber, means to remove said cooling medium from said cooling chamber, means to lead said removed cooling medium into said precooler and means to prevent the cooling medium in said cooling chamber to come in contact with the adsorbents in said precooler by allowing a small amount of steam or gas to enter the cooling chamber from the adsorbent material in the precooler.

In testimony whereof I affix my signature.
FRIEDRICH JAKOB BECHTHOLD.